United States Patent
Mitsubayashi (10) Patent No.: US 10,220,814 B2
(45) Date of Patent: Mar. 5, 2019

(54) VEHICLE CONTROL SYSTEM

(71) Applicant: DENSO CORPORATION, Kariya, Aichi-pref. (JP)

(72) Inventor: Hironori Mitsubayashi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/061,359

(22) PCT Filed: Nov. 21, 2016

(86) PCT No.: PCT/JP2016/084439
§ 371 (c)(1),
(2) Date: Jun. 12, 2018

(87) PCT Pub. No.: WO2017/104352
PCT Pub. Date: Jun. 22, 2017

(65) Prior Publication Data
US 2018/0361991 A1 Dec. 20, 2018

(30) Foreign Application Priority Data

Dec. 14, 2015 (JP) .................. 2015-242992

(51) Int. Cl.
*B60R 25/24* (2013.01)
*B60R 16/037* (2006.01)
*G07C 9/00* (2006.01)

(52) U.S. Cl.
CPC ............ *B60R 25/24* (2013.01); *B60R 16/037* (2013.01); *B60R 25/245* (2013.01); *G07C 9/00309* (2013.01)

(58) Field of Classification Search
CPC ..... B60R 25/24; B60R 25/245; B60R 16/037; E05F 15/77; H04L 67/34; G07C 9/00309
(Continued)

(56) References Cited

U.S. PATENT DOCUMENTS 9,428,127 B2 * 8/2016 Cooper ................ B60R 16/037
9,892,584 B1 * 2/2018 Saylor ................ G06F 21/6209
(Continued)

FOREIGN PATENT DOCUMENTS

| JP | 2013191209 A | 9/2013 |
| JP | 2014218859 A | 11/2014 |
| JP | 2015085720 A | 5/2015 |

*Primary Examiner* — Ali Neyzari
(74) *Attorney, Agent, or Firm* — Harness, Dickey & Pierce, P.L.C.

(57) ABSTRACT

A vehicle control system includes a vehicle apparatus and a key. A confirmer of the vehicle apparatus is configured to confirm existence or non-existence of a second key, which is different from a first key, in a vehicle interior in response to locking of a vehicle by the first key. An authenticator of the key is configured to perform an authentication for authenticating that a user using the key is an authenticated user. An effectivity controller of the vehicle apparatus is configured to disable a function of a permitter concerning the second key when the second key exists in the vehicle interior and the authentication concerning the second key is unsuccessful. The effectivity controller is configured to enable the function of the permitter concerning the second key when the second key exists in the vehicle interior and the authentication concerning the second key is successful.

3 Claims, 11 Drawing Sheets

(58) Field of Classification Search
USPC .......................................................... 340/5.61
See application file for complete search history.

(56) References Cited

U.S. PATENT DOCUMENTS

2006/0255911 A1  11/2006  Taki et al.
2013/0324081 A1  12/2013  Gargi et al.

* cited by examiner

VEHICLE CONTROL SYSTEM

CROSS REFERENCE TO RELATED APPLICATIONS

This application is a U.S. National Phase Application under 35 U.S.C. 371 of International Application No. PCT/JP2016/084439 filed on Nov. 21, 2016 and published in Japanese as WO 2017/104352 A1 on Jun. 22, 2017. This application is based on and claims the benefit of priority from Japanese Patent Application No. 2015-242992 filed on Dec. 14, 2015. The entire disclosures of all of the above applications are incorporated herein by reference.

TECHNICAL FIELD

The present disclosure relates to a vehicle control system that permits predetermined manipulation on a vehicle based on wireless communication between a vehicle apparatus mounted to the vehicle and a key carried by a user.

BACKGROUND ART

Conventionally, there has been known a vehicle control system that permits predetermined manipulation such as locking or unlocking a vehicle or starting an engine on the vehicle based on wireless communication between a vehicle apparatus mounted to the vehicle and a key carried by a user.

In terms of the vehicle control system, Patent Literature 1 discloses a technology that acquires existence information indicating existence of a mobile unit (e.g., key) in a stopped vehicle and, in such a case, at least temporarily disables a function of a permission means to permit the predetermined manipulation on the vehicle based on reception of an electromagnetic wave returned from the mobile unit.

The technology according to Patent Literature 1 restricts the mobile unit from being locked in the vehicle due to an electromagnetic wave leaked in the vehicle when communication between the mobile unit and the vehicle locks or unlocks a door.

PRIOR ART LITERATURE

Patent Literature

Patent Literature 1: JP 2014-218859 A

SUMMARY OF INVENTION

Suppose a key is left in a vehicle interior and another key is used to lock the vehicle. In such a case, there may be a configuration that disables the key in the vehicle interior from manipulating the vehicle for improved security. When this configuration is used, however, suppose a passenger carrying the key is left in the vehicle interior, and the driver gets off the vehicle and locks the vehicle using the other key carried by the driver. In such a case, the key of the passenger is disabled. The passenger cannot manipulate the vehicle.

It is an object of the present disclosure to provide a vehicle control system that ensures a security and enables an authenticated user, if left in a vehicle interior, to manipulate a vehicle using a key when the key is left in the vehicle interior and another key locks the vehicle.

According to an aspect of the present disclosure, a vehicle control system includes a vehicle apparatus configured to be mounted to a vehicle and a key configured to be carried by a user of the vehicle and have wireless communication with the vehicle apparatus. The vehicle apparatus includes a permitter, a confirmer, and an effectivity controller. The key includes an authenticator and a transmitter.

The permitter is configured to permit predetermined manipulation on the vehicle based on wireless communication with the key. The authenticator is configured to perform an authentication for authenticating that the user using the key is an authenticated user. The transmitter is configured to transmit an authentication result signal corresponding to a result of the authentication to the vehicle apparatus.

The key includes a first key and a second key different from the first key. The confirmer is configured to confirm existence or non-existence of the second key in a vehicle interior by attempting wireless communication with the second key in the vehicle interior in response to locking of the vehicle by the first key. The effectivity controller is configured to disable a function of the permitter concerning the second key when the confirmer confirms the existence of the second key in the vehicle interior and the authentication result signal concerning the second key indicates that the authentication is unsuccessful. The effectivity controller is configured to enable the function of the permitter concerning the second key when the confirmer confirms the existence of the second key in the vehicle interior and the authentication result signal concerning the second key indicates that the authentication is successful.

The aspect of the present disclosure enables the function of the permitter concerning the second key when the second key, which is different from the first key used to lock the vehicle, exists in the vehicle interior and the user using the second key is successfully authenticated as an authenticated user.

The authenticated user, if remaining in the vehicle interior, can therefore manipulate the vehicle by using the key on condition that the authentication succeeds. An unsuccessful authentication disables the function of the permitter concerning the second key. It is possible to restrict the second key from being used to manipulate the vehicle when the authenticated user does not remain in the vehicle interior. Namely, the security can be ensured.

BRIEF DESCRIPTION OF DRAWINGS

The above and other objects, features and advantages of the present disclosure will become more apparent from the following detailed description made with reference to the accompanying drawings, in which.

DESCRIPTION OF EMBODIMENTS

First Embodiment

A first embodiment of the present disclosure will be described below with reference to the accompanying drawings.

Figure 1:
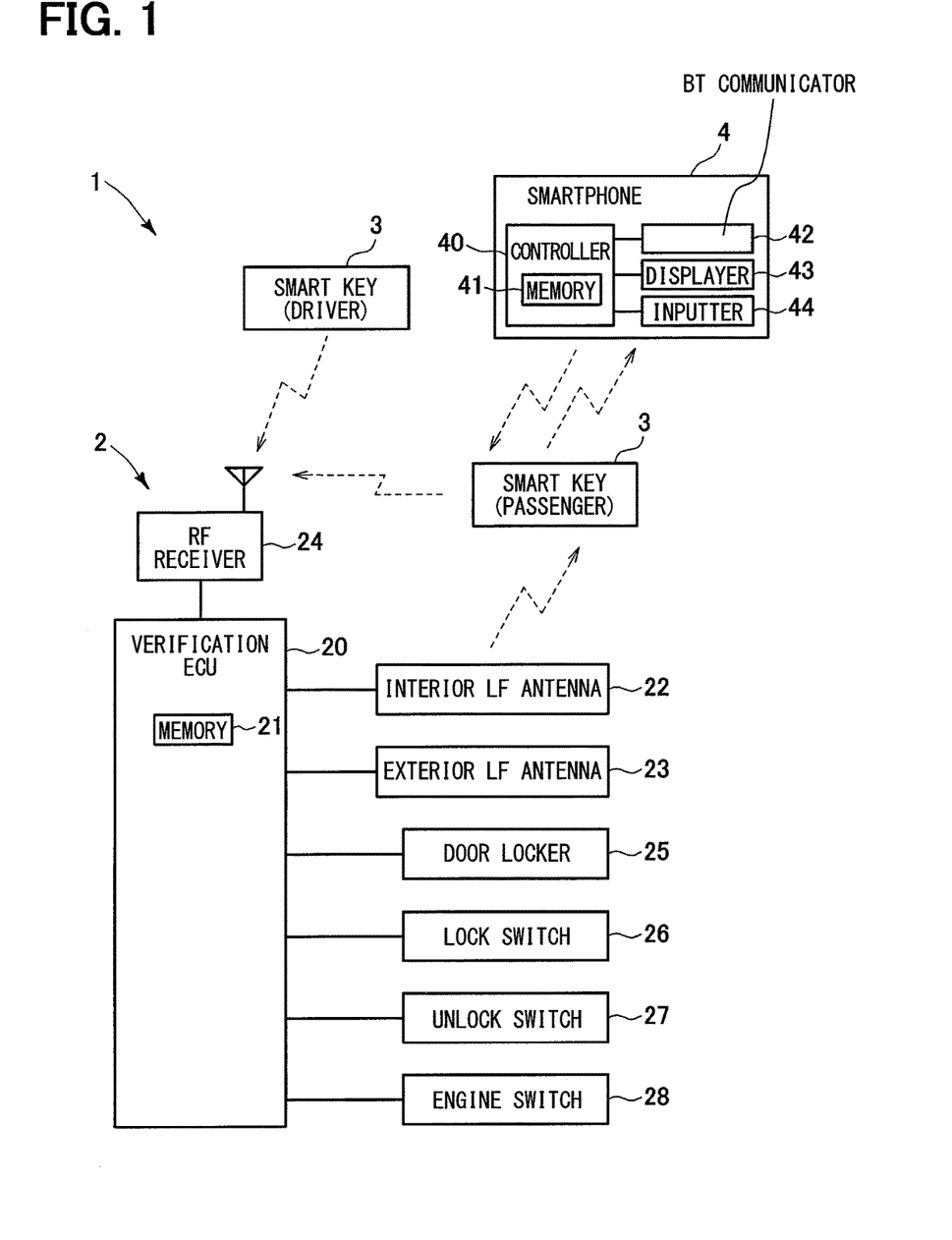
FIG. 1 is a configuration diagram of a vehicle control system.

A vehicle control system 1 as illustrated in FIG. 1 includes a vehicle apparatus 2, a smart key 3, and a smartphone 4.

The vehicle control system 1 is configured as an electronic key system (so-called smart entry system) that permits predetermined manipulation on a vehicle 100 (see FIG. 12) such as locking or unlocking vehicle doors or starting an engine based on bidirectional communication between the vehicle apparatus 2 and the smart key 3. The vehicle control system 1 also complies with RKE (Remote Keyless Entry) that locks or unlocks vehicle doors based on unidirectional communication from the smart key 3.

The vehicle apparatus 2 is mounted to the vehicle 100 and includes an interior LF (Low Frequency) antenna 22, an exterior LF antenna 23, an RF (Radio Frequency) receiver 24, a door locker 25, a lock switch 26, an unlock switch 27, an engine switch 28, and a verification ECU 20 (ECU: Electronic Control Unit) connecting with these components.

The interior LF antenna 22 and the exterior LF antenna 23 are mounted at a plurality of positions of the vehicle 100 and transmit a signal requesting a response within a range corresponding to the mounted position. The signal is transmitted as an LF-band (such as 125 KHz) radio wave. The signal transmitted from the antenna 22 or 23 is hereinafter referred to as an LF signal. The LF signal is used to search for the smart key 3 existing in the vehicle interior or around the vehicle 100. The interior LF antenna 22 transmits the LF signal toward the vehicle interior. The exterior LF antenna 23 transmits the LF signal around the vehicle 100 (such as a range of one to two meters from the vehicle 100).

The RF receiver 24 receives a signal (hereinafter referred to as an RF signal) transmitted as an RF-band radio wave (such as a radio wave of 300 to 400 MHz) from the smart key 3.

The door locker 25 includes a lock mechanism and a motor. The lock mechanism is provided for each door and locks the door. The motor operates the lock mechanism for locking or unlocking.

The lock switch 26 (such as a push switch) is provided near a door handle provided outside of each door of the vehicle 100, for example. A user manipulates the lock switch 26 to enable the vehicle apparatus 2 (verification ECU 20) to lock the door.

The unlock switch 27 is provided near a door handle provided outside of each door of the vehicle 100, for example. A user manipulates the unlock switch 27 to enable the vehicle apparatus 2 (verification ECU 20) to unlock the door. The unlock switch 27 is configured as a sensor (such as a capacitance sensor) to detect a touch (contact) on the door handle by a user, for example.

The lock switch 26 and the unlock switch 27 may be replaced by a single switch (such as a push switch). In this case, the verification ECU 20 performs a process based on an unlock instruction when the switch is manipulated while the door is locked. Alternatively, the verification ECU 20 performs a process based on a lock instruction when the switch is manipulated while the door is unlocked.

The engine switch 28 (such as a push switch) is provided for an instrument panel near a driver's seat in the vehicle interior. A user manipulates the engine switch 28 to enable the vehicle apparatus 2 to start an engine of the vehicle 100.

The verification ECU 20 includes a CPU, ROM, and RAM and provides a controller to perform various processes concerning the electronic key system. The verification ECU 20 includes memory 21 such as ROM and RAM that store various types of information. The memory 21 stores a program for processes performed by the verification ECU 20 and verification data (master ID code) used to authenticate that the smart key 3 is authentic. A plurality of the smart keys 3 (two in FIG. 1) are provided. The memory 21 registers ID (identification information) of each smart key 3.

The process of the verification ECU 20 will be outlined. When a user gets into the vehicle 100, the verification ECU 20 allows the exterior LF antenna 23 to transmit an LF signal around the vehicle 100. The RF receiver 24 receives an RF signal transmitted from the smart key 3 in response to the LF signal. The verification ECU 20 then verifies verification data (ID code) contained in the RF signal and verification data (master ID code) allocated to the verification ECU 20. The verification ECU 20 permits the door to be unlocked (bringing the unlock switch 27 into standby condition) when the verification succeeds. The verification ECU 20 allows the door locker 25 to unlock the door when the unlock switch 27 is manipulated thereafter.

To start the engine of the vehicle 100, the verification ECU 20 allows the interior LF antenna 22 to transmit an LF signal based on manipulation of the engine switch 28. The verification ECU 20 performs the verification as above when the RF receiver 24 receives the RF signal in response to the LF signal. The verification ECU 20 enables an engine ECU (not illustrated) to start the engine when the verification succeeds.

When the user gets off the vehicle 100, the verification ECU 20 allows the LF antennas 22 and 23 to transmit LF signals around the vehicle 100 and in the vehicle interior based on manipulation of the lock switch 26. The verification ECU 20 allows the door locker 25 to lock the door when the abovementioned verification succeeds based on the transmitted LF signals.

The verification based on the LF signal transmitted outside the vehicle may fail and the verification based on the LF signal transmitted inside the vehicle interior may succeed. In such a case, the verification ECU 20 stops locking the door and issues an alarm by using a buzzer on the assumption that the smart key may be left in the vehicle interior.

Suppose the RF receiver 24 receives an RF signal transmitted from the smart key 3 based on manipulation of the switches 35 and 36 (see FIG. 2) as a process related to the RKE system. The verification ECU 20 then determines whether the received signal enables locking or unlocking. The verification ECU 20 locks or unlocks the door based on a determination result.

The RF signal transmitted from the smart key 3 contains an ID of the smart key 3. The ID contained in the RF signal enables the verification ECU 20 to specify which of the registered smart keys 3 is used to manipulate the vehicle.

The process performed by the verification ECU 20 has been outlined. The process will be described in more detail with reference to flowcharts.

The configuration of the smart key 3 will be described. The smart key 3 is carried by a user of the vehicle 100. The present embodiment provides two smart keys 3. One smart key 3 is carried by a driver of the vehicle 100. The other smart key 3 is carried by a passenger.

Figure 2:
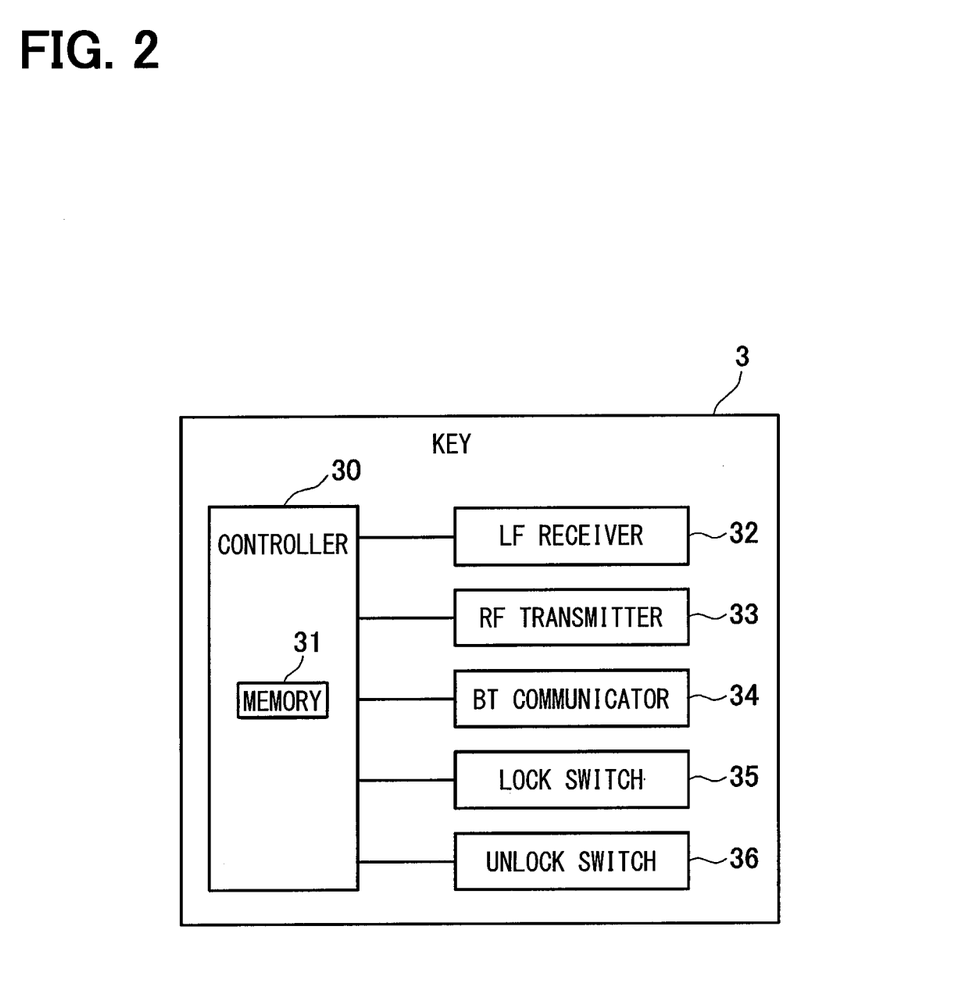
FIG. 2 is a configuration diagram of a smart key.

As illustrated in FIG. 2, the smart key 3 includes an LF receiver 32, an RF transmitter 33, a BT communicator 34, a lock switch 35, an unlock switch 36, and a controller 30 connecting with these components.

The LF receiver 32 receives an LF signal transmitted from the vehicle apparatus 2. The RF transmitter 33 transmits a transmission signal output from the controller 30 around the smart key 3. The transmission signal is transmitted as an RF-band radio wave (RF signal). The RF transmitter 33 transmits signals within a predetermined range of 10 to 30 meters from the smart key 3, for example.

The BT communicator 34 is an apparatus that performs wireless communication with a nearby wireless communications device (the smartphone 4 according to the present embodiment) having the Bluetooth (registered trademark) communication function based on the Bluetooth (registered trademark) communication system. The BT communicator 34 provides a predetermined communication range (communication distance) from several meters to several tens of meters from the smart key 3, for example. Communications devices used for communication require pairing therebetween before performing wireless communication based on Bluetooth (registered trademark).

The lock switch 35 and the unlock switch 36 are provided as push switches, for example, and are exposed from a body of the smart key 3 so that a user can manipulate the switches to enable locking (lock switch 35) or unlocking (unlock switch 36) of the vehicle door.

The controller 30 includes a CPU, ROM, and RAM and performs various processes concerning the electronic key system. The controller 30 includes memory 31 such as ROM and RAM that stores various types of information. The memory 31 stores a program for processes performed by the controller 30 verification data used to authenticate that the smart key 3 is authentic, and an ID of the smart key 3.

The memory 31 also stores data (hereinafter referred to as user authentication data) to authenticate that the user using the smart key 3 is an authenticated user. The user authentication is performed between the smart key 3 and the smartphone 4. In other words, the user authentication authenticates that the smart key 3 is carried by a user carrying the smartphone 4 or is controlled by the user.

The process performed by the controller 30 will be outlined. Suppose the LF receiver 32 receives an LF signal from the vehicle apparatus 2. The controller 30 then generates a signal in response to the received LF signal and allows the RF transmitter 33 to transmit the generated signal as an RF signal.

Suppose the lock switch 35 is manipulated as a process related to the RKE system. The controller 30 then allows the RF transmitter 33 to transmit an RF signal enabling the vehicle door to be locked. Suppose the unlock switch 36 is manipulated. The controller 30 then allows the RF transmitter 33 to transmit an RF signal enabling the vehicle door to be unlocked. The controller 30 allows the RF signal to contain the verification data stored in the memory 31 or the ID of the controller 30.

The process performed by the controller 30 has been outlined. The process will be described in more detail with reference to flowcharts.

The configuration of the smartphone 4 will be described. The smartphone 4 is a publicly known mobile telephone that is carried by an authenticated user of the vehicle 100 and includes the call function to enable wireless calling. The description below assumes that the smartphone 4 is carried by a passenger of the vehicle 100. The smartphone 4 includes a BT communicator 42, a displayer 43, an inputter 44, and a controller 40 connecting with these components.

The BT communicator 42 is a communication apparatus that performs wireless communication with a nearby wireless communications device having the Bluetooth (registered trademark) communication function based on the Bluetooth (registered trademark) communication system. The BT communicator 42 provides a predetermined communication range from several meters to several tens of meters from the smartphone 4, for example. The communication range of the BT communicators 34 and 42 is favorably approximate to a range in the vehicle interior.

Suppose the communication range is too wider than the inside of the vehicle interior and a passenger leaves the vehicle interior. In such a case, the user authentication may succeed between the smart key 3 existing in the vehicle interior and the smartphone 4 carried by the passenger outside the vehicle. This contradicts the purpose of enabling the smart key 3 when the passenger is left in the vehicle interior.

The displayer 43 is provided as a liquid crystal display, for example, and displays various types of information. The inputter 44 accepts input manipulation of a user such as entering phone numbers. The inputter 44 may be provided as a sensor that detects touch manipulation on an input screen displayed on the displayer 43 or detects a movable manipulator or manipulation on the movable manipulator.

The controller 40 includes a CPU, ROM, and RAM, and performs processes concerning the call function or controls the BT communicator 42. The controller 40 includes memory 41 such as ROM and RAM that store various types of information. The memory 41 stores a program for processes performed by the controller 40.

The memory 41 also stores user authentication data to perform the user authentication of the smart key 3 on the smart key 3. This user authentication data is verified with reference to the user authentication data stored in the memory 31 of the smart key 3. The smart key 3 and the smartphone 4 are capable of performing the user authentication on the smart key 3 based on the wireless communication between the BT communicators 34 and 42.

Figure 12:
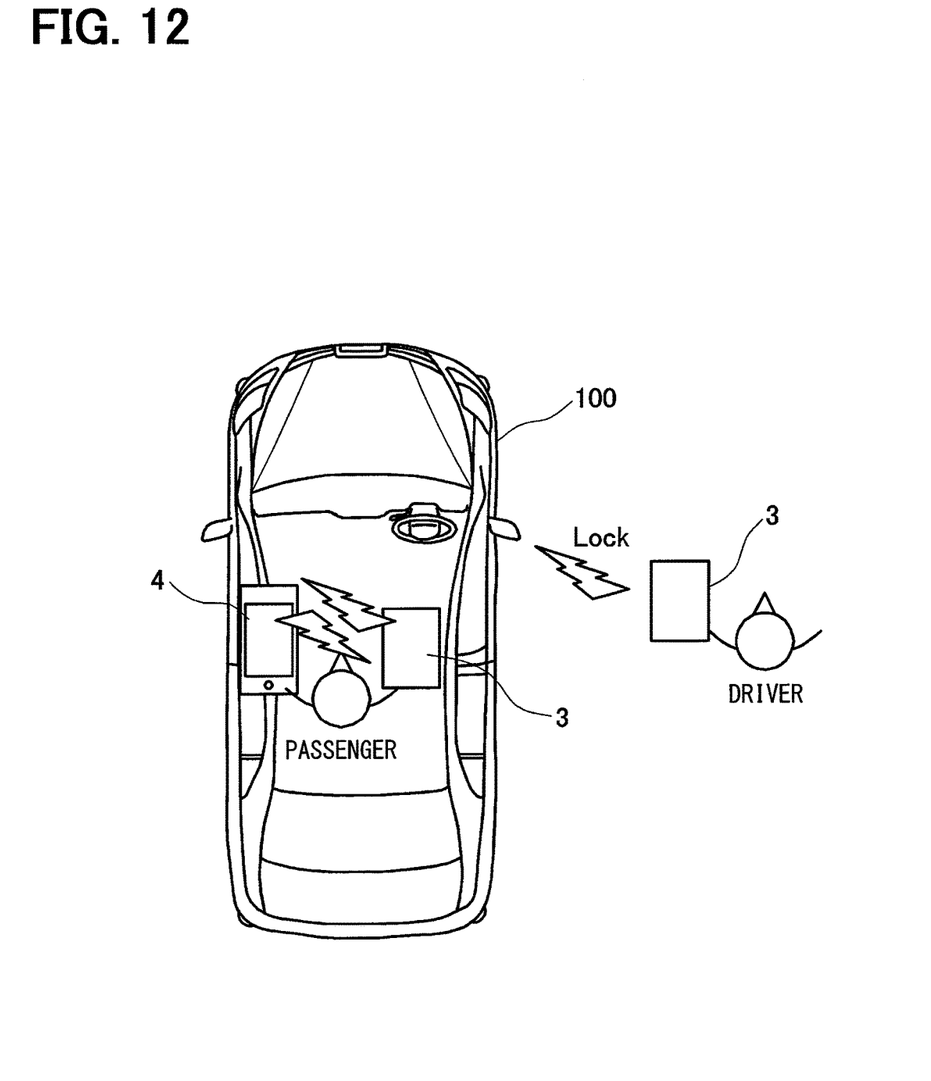
FIG. 12 is a diagram illustrating a situation where a passenger carrying a smart key and a smartphone is left in a vehicle interior and a driver gets off the vehicle and locks a vehicle door using a smart key of the driver.

FIG. 12 illustrates a situation where a passenger is left in the vehicle interior, a driver gets out of the vehicle, and the driver locks the vehicle door using the smart key 3 carried by the driver. The passenger carries the smart key 3 (second key) different from the smart key 3 (first key) of the driver. The passenger also carries the smartphone 4 capable of user authentication of the smart key 3. In this situation, the passenger needs to manipulate the vehicle 100 using the smart key 3 carried by the passenger if the driver having got out of the vehicle does not return.

Alternatively, suppose no passenger exists, the smart key 3 is left in the vehicle interior, and the driver locks the vehicle using another smart key 3. If the smart key 3 in the vehicle interior is left enabled in this case, an intruder may illegally enter the vehicle interior and steal the vehicle 100 using the smart key 3. To solve this, the vehicle control system 1 enables the smart key 3 in the vehicle interior in a case of the passenger remaining in the vehicle interior and disables the smart key 3 in the same in a case of no passenger remaining in the vehicle interior when the smart key 3 is left in the vehicle interior and another smart key 3 locks the vehicle 100.

Figure 5:
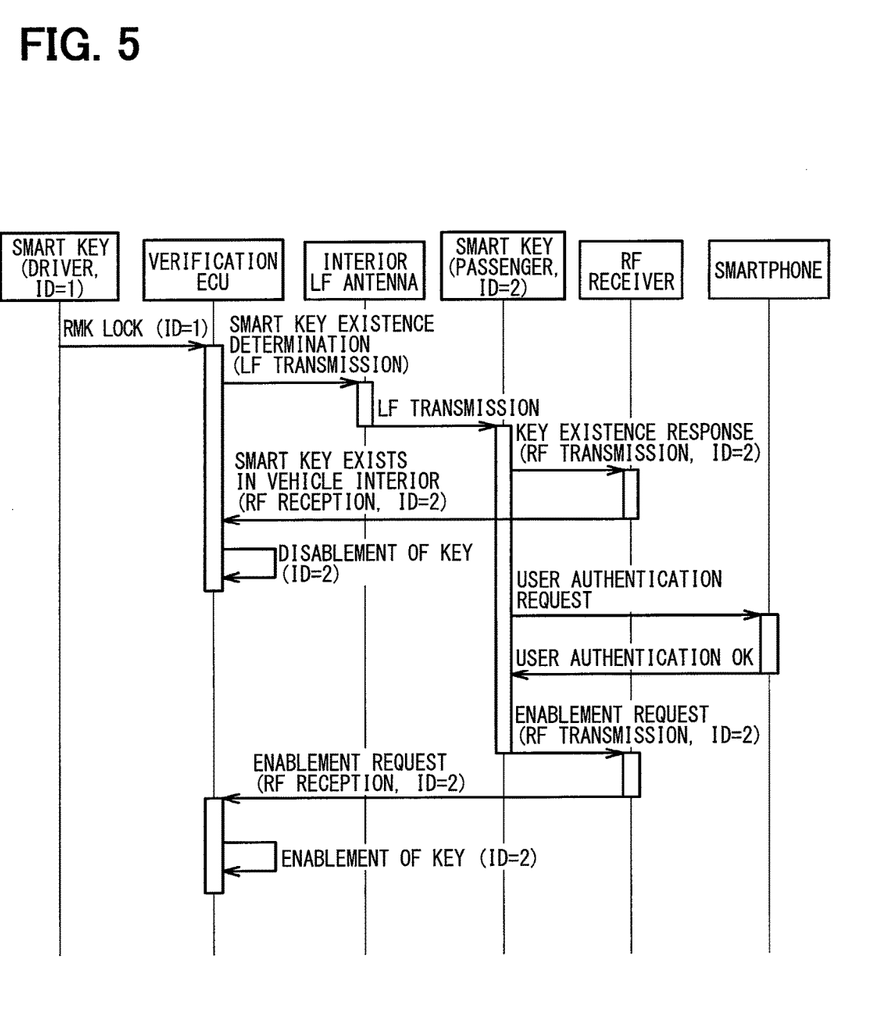
FIG. 5 is a timing chart illustrating a process that automatically performs user authentication between the smart key and a smartphone after disabling the smart key in the vehicle interior, and releases the disablement when the authentication is successful.

The description below explains processes that are performed by the vehicle apparatus 2, the smart key 3, and the smartphone 4 and disable or enable a vehicle manipulation function of the smart key 3 remaining in the vehicle interior depending on situations. The description below explains the process of the vehicle apparatus 2 with reference to FIGS. 3 and 5. FIG. 5 is a timing chart based on the situation in FIG. 12. FIG. 5 assumes that the smart key 3 (BT communicator 34) and the smartphone 4 (BT communicator 42) remaining in the vehicle interior are previously paired so as to be capable of bidirectional communication.

The smart key 3 and the smartphone 4 are first paired based on user manipulation on the smart key 3 and the smartphone 4. A set of the smart key 3 and the smartphone 4 once paired may be automatically paired thereafter without user manipulation when the BT communicators 34 and 42 reach the communicable range. Alternatively, the second and later pairing may also require the user manipulation.

Figure 3:
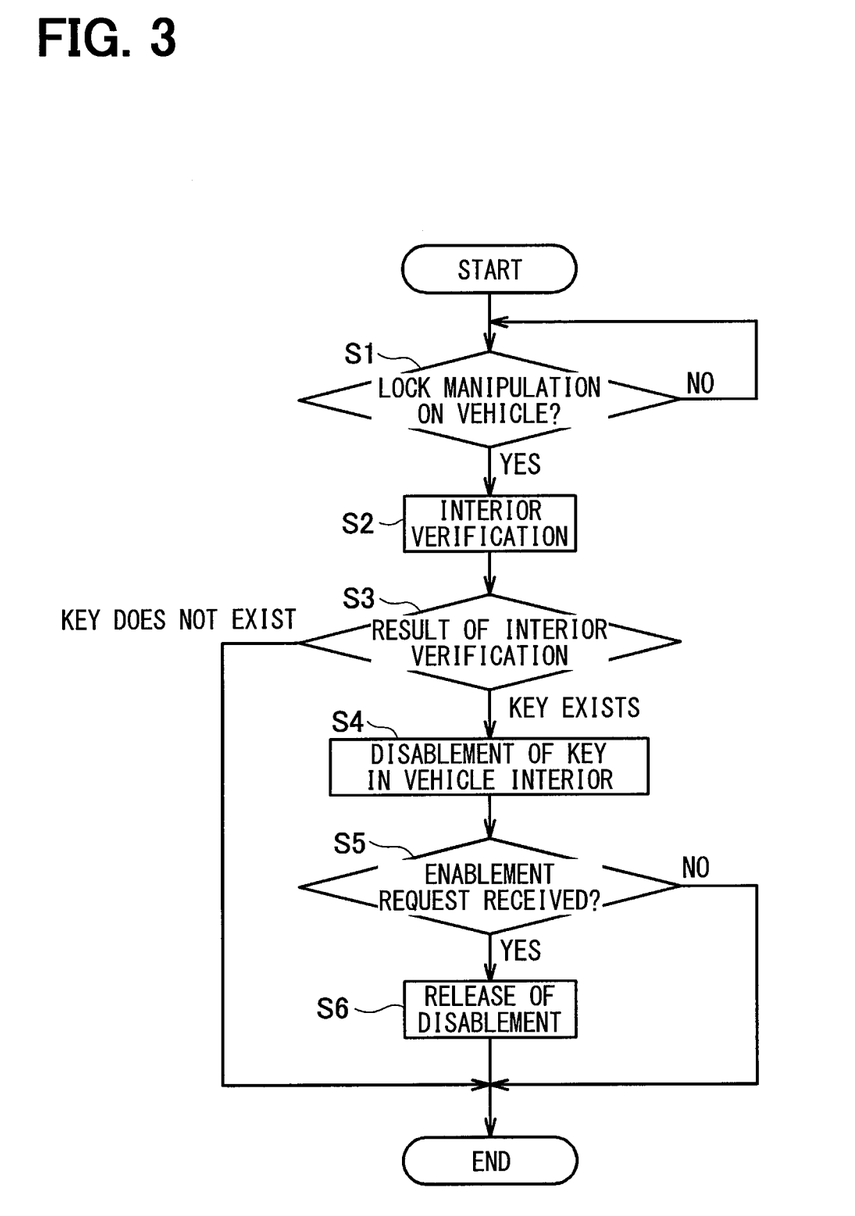
FIG. 3 is a flowchart illustrating a process performed by a verification ECU according to a first embodiment.

When starting the process in FIG. 3, the verification ECU 20 determines whether the smart key 3 is used for lock manipulation on the vehicle 100 (S1). This lock manipulation includes: lock manipulation based on an RF signal transmitted from the smart key 3 in response to an LF signal from the vehicle apparatus 2; and lock manipulation (RKE lock) based on an RF signal transmitted from the smart key 3 due to manipulation on the lock switch 35 (see FIG. 2). If the smart key 3 includes a mechanical key, the lock manipulation of the process at S1 also includes lock manipulation by inserting the mechanical key into a key cylinder provided outside the vehicle door. However, the lock manipulation of the process at S1 does not include lock manipulation due to manipulation on a knob provided inside the vehicle interior. FIG. 5 illustrates an example of RKE lock by using the smart key 3 with ID=1 carried by the driver.

There may occur no vehicle lock manipulation (S1: No). In this case, the process waits until the vehicle lock manipulation occurs. There may occur the vehicle lock manipulation (S1: Yes). In this case, interior verification is performed to determine whether or not the smart key 3 different from the smart key 3 used for the vehicle lock manipulation remains in the vehicle interior (S2).

Specifically, as illustrated in FIG. 5, the verification ECU 20 enables the interior LF antenna 22 to transmit an LF signal inside the vehicle interior. At this time, the LF signal is forced to contain authentication request data that requests the smart key 3 receiving the LF signal to perform the user authentication in communication with the smartphone 4. At S2, the process verifies the verification data contained in the RF signal received by the RF receiver 24 in response to the transmitted LF signal and the verification data maintained in the verification ECU 20.

The verification may fail as a result of the interior verification (S3). Namely, no RF signal is received from the smart key 3 or the verification may fail even if the RF signal is received. In this case, the process in FIG. 3 terminates, assuming that the smart key 3 does not exist in the vehicle interior.

The interior verification may succeed. In this case, the process disables the vehicle manipulation function of the smart key 3 in the vehicle interior, assuming that the smart key 3 different from the smart key 3 used for the lock manipulation exists in the vehicle interior (S4).

Specifically, the ID is contained in the RF signal received during the interior verification at S2. This ID is maintained as an invalid key ID in the memory 21. The process subsequently ignores the RF signal, if received, containing the invalid key ID and disallows the vehicle manipulation. FIG. 5 illustrates an example where the smart key 3 with ID=2 exists in the vehicle interior and is disabled.

The vehicle control system 1 may include an immobilizer. The vehicle manipulation based on the immobilizer is also disabled for the disabled smart key 3. In the immobilizer, approximating a key to a radio wave generator provided for the vehicle allows the radio wave generator to generate a radio wave that then allows a transponder provided for the key to generate electric power. The generated electric power allows the key to transmit verification data to the vehicle so that the vehicle can verify the key. The engine is allowed to start when the verification succeeds. The immobilizer enables the engine to start even if the key battery is dead.

The process determines whether or not an RF signal for enablement request is received from the disabled smart key 3 (S5). The RF signal for enablement request is transmitted when the user authentication on the smart key 3 succeeds. The enablement request may not be received (S5: No). In this case, the process in FIG. 3 terminates. The smart key 3 in the vehicle interior remains disabled.

The enablement request may be received (S5: Yes). In this case, the process releases disablement of the disabled smart key 3 (assigned ID=2 according to the example in FIG. 5) to enable the smart key 3 (S6). The process in FIG. 3 then terminates.

The verification ECU 20 also releases the disablement of the disabled smart key 3 in the vehicle interior when the smart key 3 (enabled smart key) other than the disabled smart key 3 is used for the vehicle manipulation such as locking or unlocking the vehicle door or starting the engine.

Figure 4:
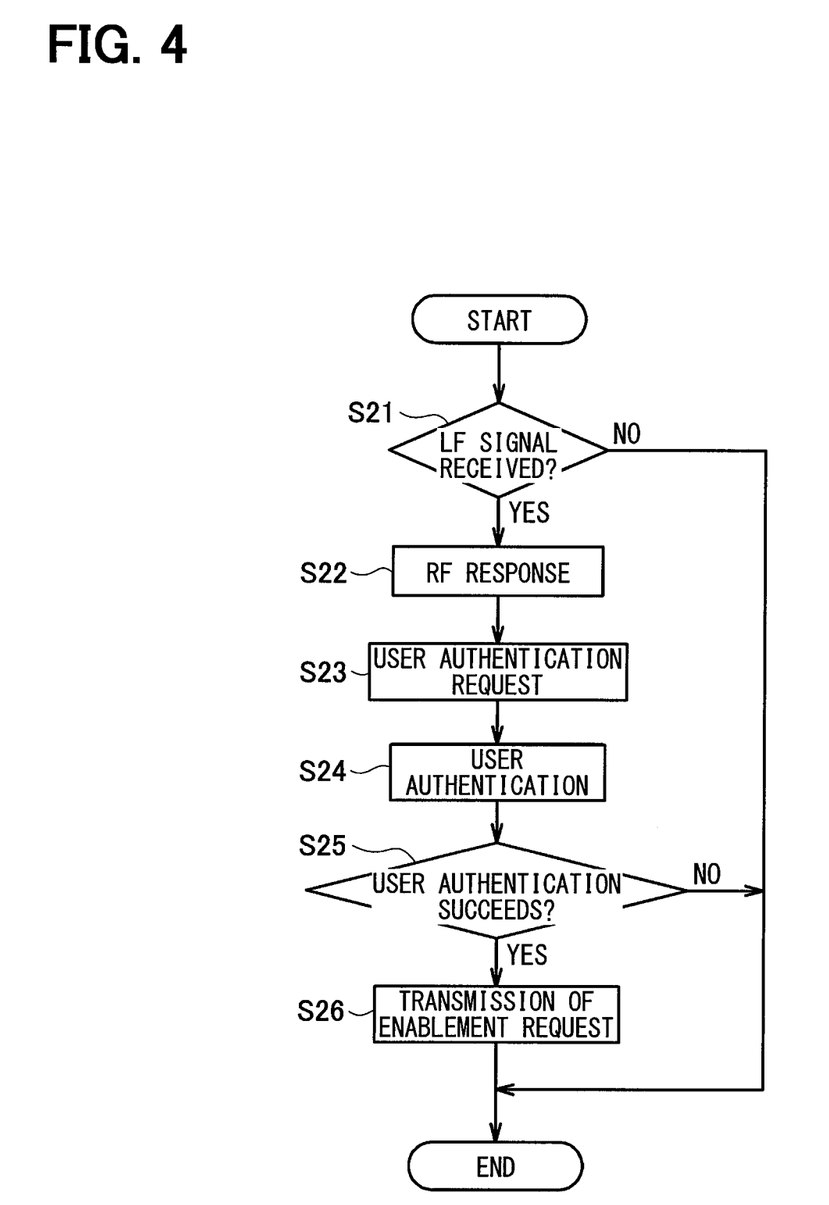
FIG. 4 is a flowchart illustrating a process performed by a controller of a smart key according to the first embodiment.

The description below explains processes of the smart key 3 and the smartphone 4 with reference to FIGS. 4 and 5. When starting the process in FIG. 4, the controller 30 of the smart key 3 determines whether or not the LF signal containing the authentication request data is transmitted from the vehicle apparatus 2 at S2 in FIG. 3 (S21). The LF signal may not be received (S21: No). In this case, the process in FIG. 4 terminates.

The LF signal containing the authentication request data may be received (S21: Yes). In this case, the process responds to the reception of the LF signal by allowing an RF receiver 33 to transmit an RF signal indicating the presence of the smart key 3 in the vehicle interior (S22). The RF signal transmitted this time contains the ID of the key itself and the verification data to authenticate the smart key 3 on the vehicle apparatus 2. The response can allow the vehicle apparatus 2 to recognize that the smart key 3 other than the smart key 3 used for the lock manipulation remains in the vehicle interior. The process at S4 in FIG. 3 disables the key in the vehicle interior.

The controller 30 issues a user authentication request to the smartphone 4 (namely, the BT communicator 42 of the smartphone 4) based on wireless communication using the BT communicator 34 (S23). The user authentication request is triggered by reception of the LF signal containing the authentication request data or is performed automatically without user manipulation.

After performing the user authentication request, the process performs the user authentication of the smart key 3 based on the wireless communication between the BT communicators 34 and 42 (S24). Specifically, the process verifies the user authentication data stored in the memory 31 of the controller 30 and the user authentication data stored in the memory 41 of the smartphone 4. The verification may be performed on the smart key 3 or the smartphone 4. For example, the verification on the smartphone 4 transmits the user authentication data maintained in the smart key 3 to the smartphone 4. The smartphone 4 (controller 40) verifies the user authentication data maintained in the smartphone 4 and the authentication data from the smart key 3. When the authentication succeeds, the smartphone 4 transmits a signal indicating the successful user authentication to the smart key 3.

The user authentication may be performed as follows. The smartphone 4 receives the user authentication request and the user authentication data from the smart key 3, for example, and then displays a message prompting entry of a password on the displayer 43. The user authentication may be then performed by verifying the password entered by the inputter 44 and the user authentication data (password) transmitted from the smart key 3.

Alternatively, the smartphone 4 may display a message prompting entry of a password on the displayer 43 and transmit the password entered by the inputter 44 to the smart key 3. The smart key 3 may perform the user authentication by verifying the password transmitted from the smartphone 4 and the user authentication data (password) maintained in the smart key 3.

The user authentication request at S23 and the user authentication at S24 require availability of wireless communication between the BT communicators 34 and 42 based on previous pairing. The user authentication fails when the wireless communication is unavailable in such a case as placing the smart key 3 and the smartphone 4 outside the communication range of the BT communicators 34 and 42 or placing the smart key 3 and the smartphone 4 within the communication range of the same but failing to do pairing.

The controller 30 determines whether or not the user authentication succeeds in communication with the smartphone 4 (S25). The user authentication may fail (S25: No). In this case, the process in FIG. 4 terminates. This case assumes a situation where the smartphone 4 does not exist in the vehicle interior or the smartphone 4 exists in the vehicle interior but no pairing is performed in advance.

The user authentication may succeed (S25: Yes). In this case, the process allows the RF transmitter 33 to transmit an RF signal requesting the enablement (S26). At this time, the RF signal is forced to contain the ID of the smart key. The process at S6 in FIG. 3 accordingly releases the disablement. The process in FIG. 4 then terminates.

According to the example in FIG. 5, the smart key with ID=2 is disabled, and then the user authentication is performed between the smart key and the smartphone and succeeds. As illustrated in the example, the smart key transmits an enablement request to the vehicle apparatus.

According to the present embodiment as above, the verification ECU 20 recognizes vehicle lock manipulation using the smart key 3, if any, and determines whether another smart key 3 exists in the vehicle interior. If another smart key 3 exists, the process immediately disables the vehicle manipulation function of the smart key 3 in the vehicle interior without awaiting a result of the user authentication. After the disablement, the process releases the disablement when successfully confirming that the user authentication succeeds.

An authenticated user may remain in the vehicle where the vehicle lock manipulation is performed. In such a case, the smart key 3 can be enabled by performing the user authentication between the smart key 3 and the smartphone 4 carried by the authenticated user. The authenticated user remaining in the vehicle interior can therefore manipulate the vehicle such as starting the engine, using the smart key 3 carried by the authenticated user.

The smart key 3 may exist in the vehicle interior while there is no authenticated user. In such a case, the user authentication on the smart key 3 fails and the smart key 3 can be disabled. Suppose an intruder illegally enters the vehicle interior. Even in such a case, it is possible to restrict the intruder from manipulating the vehicle by using the smart key 3 in the vehicle interior. The security can be ensured.

According to the present embodiment, reception of the LF signal triggers the user authentication of the smart key 3 to automatically start on condition that the smart key 3 and the smartphone 4 are capable of wireless communication. It is possible to reduce a burden on the user manipulation.

There is a system that enters a caution mode in response to the vehicle lock manipulation performed by the smart key and generates an alarm in order to guard the vehicle against theft when a vehicle door is opened during the caution mode without the use of the smart key. The alarm, when sounded, can be stopped on condition that the smart key performs the vehicle manipulation.

This system, when used, sounds an alarm in response to the vehicle lock manipulation performed, if any, when another smart key and a passenger remain in the vehicle interior and the passenger opens a vehicle door from inside. The smart key in the vehicle interior, if enabled, can be used to perform the vehicle manipulation (such as locking or unlocking) and thereby stop the alarm.

Second Embodiment

The description below explains a second embodiment of the present disclosure mainly in terms of differences from the abovementioned embodiment. The present embodiment controls enablement and disablement of the smart key based on a result of the user authentication when another smart key different from the smart key used for the lock manipulation exists in the vehicle interior. The present embodiment differs from the first embodiment in processes performed by the verification ECU 20 and the controller 30 and equals the first embodiment otherwise.

Figure 8:
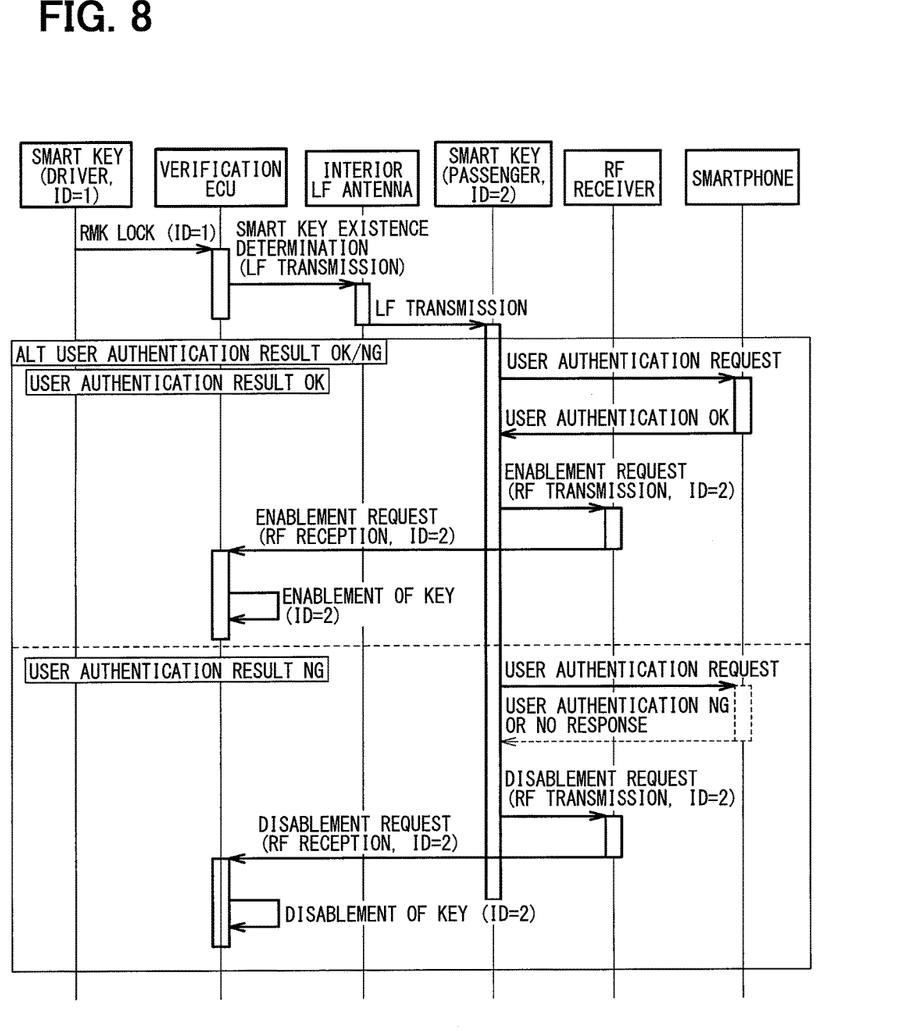
FIG. 8 is a timing chart illustrating a process that automatically performs user authentication between the smart key and the smartphone before disabling the smart key in the vehicle interior, disables the smart key when the authentication is unsuccessful, and keeps the smart key enabled when the authentication is successful.

The description below first explains the process performed by the verification ECU 20 with reference to FIGS. 6 and 8. When starting the process in FIG. 6, the verification ECU 20 determines whether the smart key 3 performs the vehicle lock manipulation (S11) similarly to the process at S1 and S2 in FIG. 3. The vehicle lock manipulation may be performed (S11: Yes). In this case, the process allows the interior LF antenna 22 to transmit an LF signal in order to determine whether another smart key 3 exists in the vehicle interior or not (S12). At S12, similarly to the process at S2 in FIG. 3, the process allows the LF signal to contain authentication request data as a request to perform the user authentication.

The process determines whether an RF signal is received in response to the LF signal transmitted at S12 (S13). No RF signal may be received (S13: No). In this case, the process in FIG. 6 terminates, assuming that the smart key 3 does not exist in the vehicle interior.

Alternatively, the RF signal may be received (S13: Yes). In this case, the process confirms the result of authenticating the smart key 3 by determining whether the received RF signal contains data to request the enablement or data to request the disablement (S14). The RF signal may contain the enablement request, or the user authentication may succeed. In this case, the process keeps the enablement of the vehicle manipulation function allowed for the smart key 3 in the vehicle interior (S15). The process in FIG. 6 then terminates. The designation of "user authentication result OK" in FIG. 8 represents the case of enabling the smart key in the vehicle interior.

The RF signal may contain disablement request data, or the user authentication may fail. In this case, the process disables the vehicle manipulation function allowed for the smart key 3 in the vehicle interior (S16).

Figure 6:
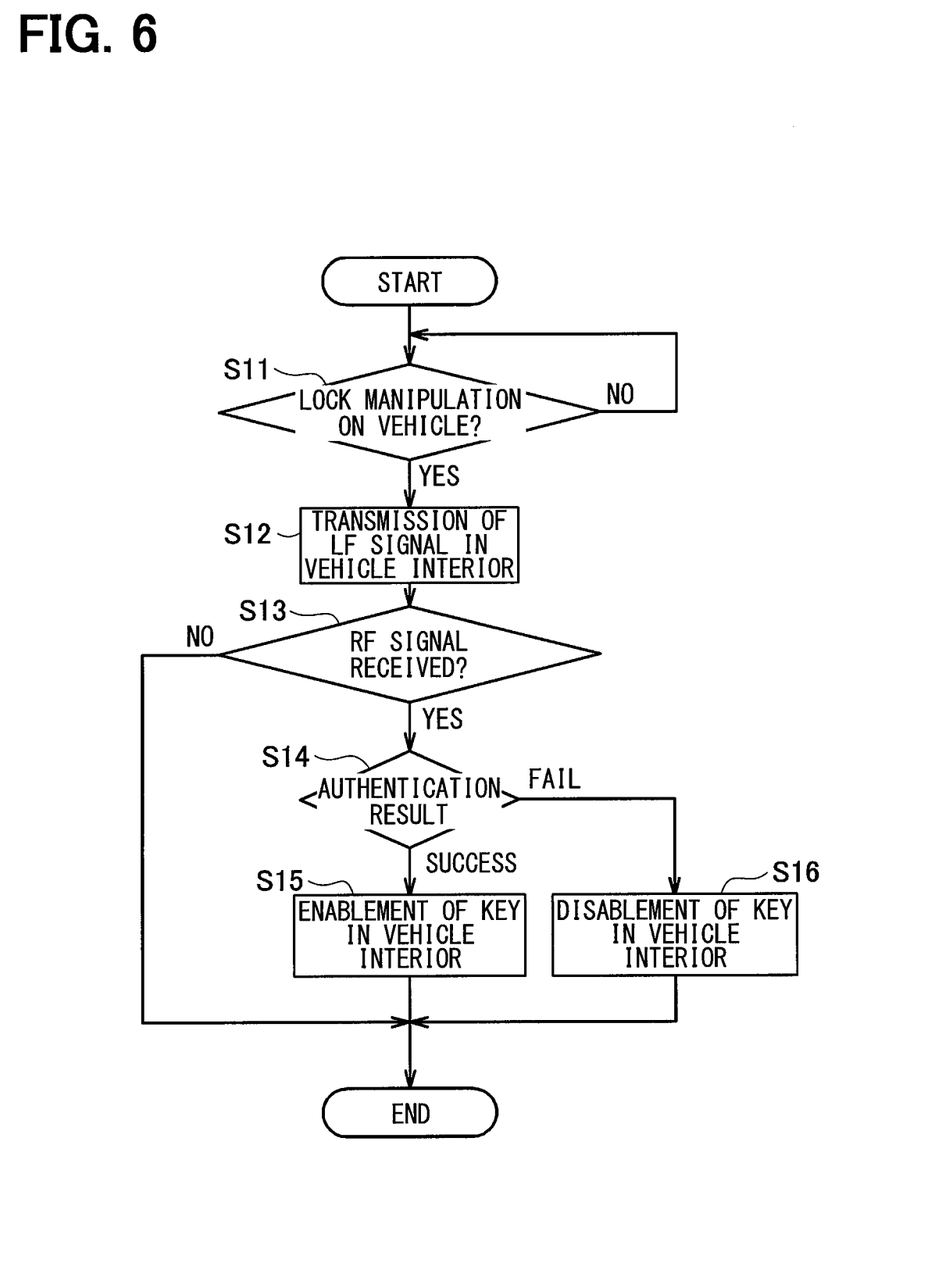
FIG. 6 is a flowchart illustrating a process performed by a verification ECU according to a second embodiment.

The process in FIG. 6 then terminates. The designation of "user authentication result NG" in FIG. 8 represents the case of disabling the smart key in the vehicle interior.

Figure 7:
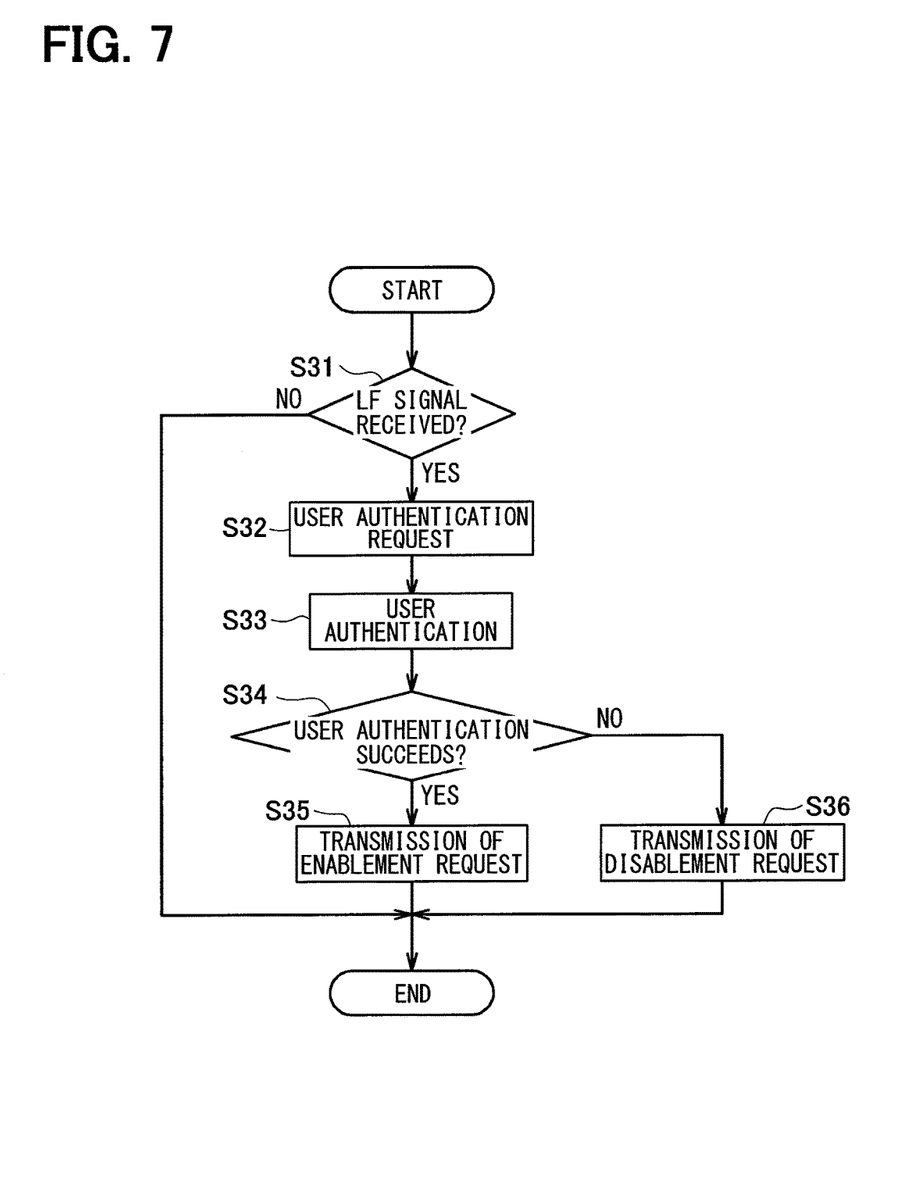
FIG. 7 is a flowchart illustrating a process performed by a controller of a smart key according to the second embodiment.

The description below explains the process performed by the controller 30 (smart key 3) with reference to FIGS. 7 and 8. When starting the process in FIG. 7, the controller 30 determines whether or not an LF signal containing the authentication request data transmitted from the vehicle apparatus 2 at S12 in FIG. 6 is received (S31). The LF signal may not be received (S31: No). In this case, the process in FIG. 7 terminates.

The LF signal may be received (S31: Yes). In this case, the smart key 3 issues the user authentication request to the smartphone 4 based on the wireless communication between the BT communicators 34 and 42, and then performs the user authentication (S32, S33, and S34) similarly to S23 through S25 in FIG. 4.

The process transmits an RF signal containing data requesting the enablement if the user authentication succeeds (S34: Yes) (S35). The process transmits an RF signal containing data requesting the disablement if the user authentication fails (S34: No) (S36). The process in FIG. 7 then terminates. At S34, the process determines that the user authentication fails also if no response returns from the smartphone 4 in reply to the user authentication request to the smartphone 4.

The present embodiment can also provide the same effect as the first embodiment.

Third Embodiment

The description below explains a third embodiment of the present disclosure mainly in terms of differences from the abovementioned embodiments. After the smart key is disabled, the present embodiment performs user authentication between the smart key and the smartphone based on manual manipulation of a user as a trigger and releases the disablement when the user authentication succeeds.

The smartphone 4 in FIG. 1 is capable of input manipulation to request the start of the user authentication by using the inputter 44. Suppose a user performs input manipulation to request the start of the user authentication. In this case, the controller 40 uses the BT communicator 42 to transmit a signal requesting the start of the user authentication to the smart key 3.

Figure 9:
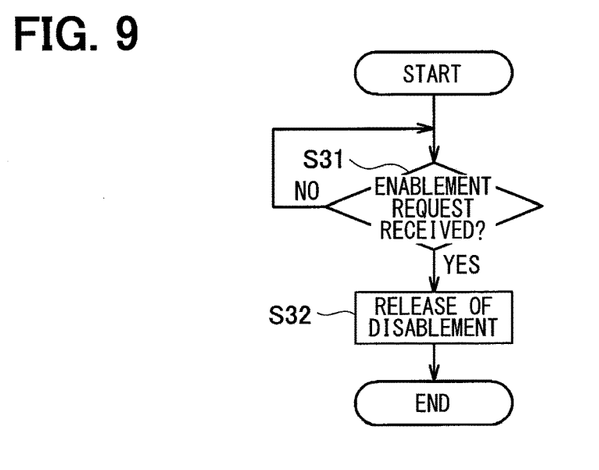
FIG. 9 is a flowchart illustrating a process performed by a verification ECU according to a third embodiment.
Figure 10:
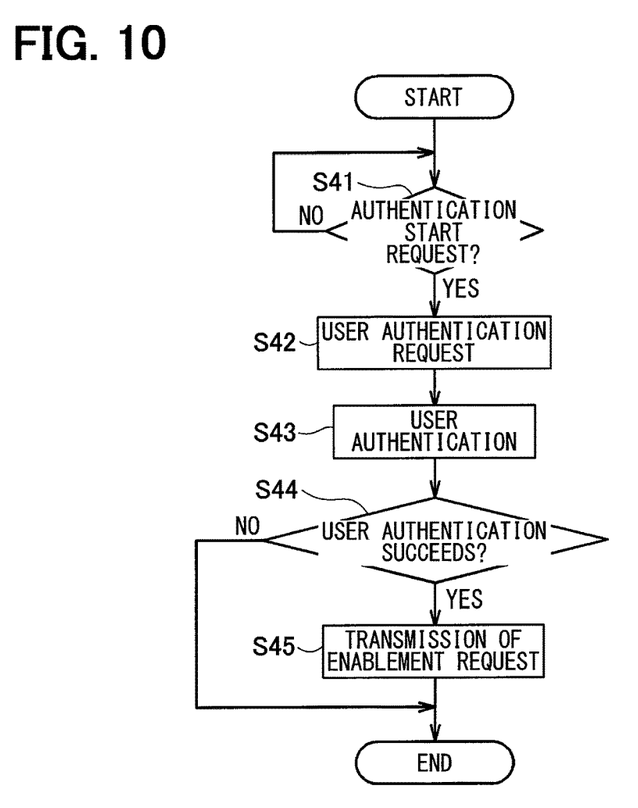
FIG. 10 is a flowchart illustrating a process performed by a controller of a smart key according to the third embodiment.
Figure 11:
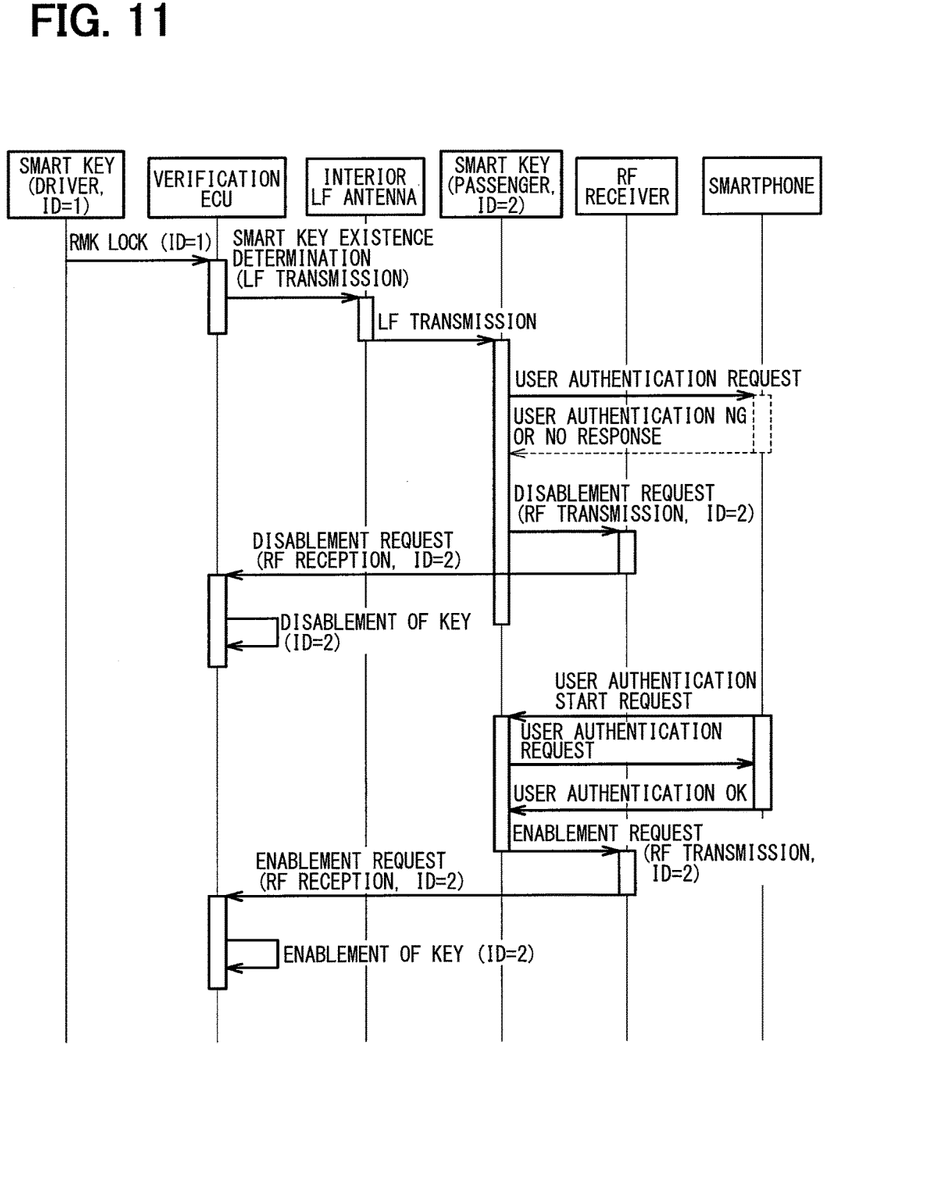
FIG. 11 is a timing chart illustrating a process that, manually performs user authentication between the smart key and the smartphone after disabling the smart key in the vehicle interior, and releases the disablement when the authentication is successful.

The description below explains processes performed by the verification ECU 20 and the controller 30 with reference to FIGS. 9 through 11. It is assumed that the processes in FIGS. 9 and 10 are performed when the smart key 3 in the vehicle interior is disabled. The process in FIG. 9 is performed immediately after the process at S5 is negated in FIG. 3, or is performed immediately after the process at S16 in FIG. 6, for example. The process in FIG. 10 is performed immediately after the process at S25 is negated in FIG. 4, or is performed immediately after the process at S36 in FIG. 7, for example.

The process performed by the controller 30 will be described first. When starting the process in FIG. 10, the controller 30 determines whether a signal requesting to start the user authentication is received from the smartphone 4 (S41). No signal may be received (S41: No). In this case, the process waits until the signal is received. The BT communicator 34 may receive the signal from the smartphone 4 (S41: Yes). In this case, the smart key 3 issues the user authentication request to the smartphone 4 based on the wireless communication between the BT communicators 34 and 42, and then performs the user authentication (S42, S43, and S44) similarly to S23 through S25 in FIG. 4. The process transmits an RF signal requesting the enablement (S45) if the user authentication succeeds (S44: Yes). The process in FIG. 7 terminates if the user authentication fails (S44: No).

The process performed by the verification ECU 20 will be then described. When starting the process in FIG. 9, the verification ECU 20 determines whether or not an enablement request signal transmitted from the smart key 3 at S45 in FIG. 10 is received (S31). No signal may be received (S31: No). In this case, the process waits until the signal is received. The enablement request may be received (S31: Yes). In this case, the process releases the disablement of the smart key 3 (S32). The process in FIG. 9 then terminates. The timing chart in FIG. 11 illustrates an example where the method of the second embodiment disables the smart key, and then the processes in FIGS. 9 and 10 release the disablement.

For example, the passenger may remain in the vehicle interior, but the smart key 3 and the smartphone 4 may be positioned too separately from each other to satisfy the communicable range. Alternatively, the smart key 3 and the smartphone 4 may be positioned closely enough to each other, but the process according to the first or second embodiment may disable the smart key 3 in the vehicle interior because no pairing is completed. Despite these situations, the present embodiment can allow the passenger to manually start the user authentication when the passenger notices that the smart key 3 is disabled. The smart key 3 can be enabled later on.

In the present disclosure, the user authentication may be performed on the smart key in the vehicle interior by using not only the smartphone, but also a portable apparatus that features the communication function and can be carried by authenticated user. The abovementioned embodiments provide the examples of performing the user authentication on the smart key based on the Bluetooth (registered trademark) communication. Moreover, the user authentication may be performed based on the other wireless communication standards such as infrared communication, wireless LAN, and NFC (Near Field Communication) or wired communication.

The user authentication on the smart key may be assumed to be successful on condition that the communication between the smart key and the smartphone succeeds. In this case, according to the examples of the abovementioned embodiments, the user authentication is assumed to be successful when the BT communicator of the smart key and the BT communicator of the smartphone are paired. The user authentication is assumed to be unsuccessful when the BT communicator of the smart key and the BT communicator of the smartphone are not paired. This can eliminate the need for pairing and subsequent verification of the user authentication data each maintained in the smart key and the smartphone. It is possible to easily determine whether the user of the smart key is authenticated or not.

The smart key may include an inputter to enter confidential information for user authentication. The information entered from the inputter based on the user manipulation may be verified with reference to the confidential information previously stored in the smart key. The user authentication may be assumed to be successful when the verification succeeds. In this case, the lock switch and the unlock switch originally included in the smart key may be used as the inputter to enter the confidential information.

In this case, the user authentication requires a user to manipulate the lock switch and the unlock switch, for example. The user authentication is assumed to be successful when the manipulation pattern conforms to a predetermined manipulation pattern. For example, suppose the lock switch manipulation is defined as 1, the unlock switch manipulation is defined as 0, and the confidential information is defined as 1011. In this case, the user authentication succeeds when the user manipulates the lock switch, the unlock switch, the lock switch, and then the lock switch in order.

The smart key may include an inputter to enter biological information (such as fingerprint or voice) about a user, and a storage portion to store the biological information (such as fingerprint or voice) about an authenticated user. The user authentication may be performed by verifying the biological information entered from the inputter and the biological information stored in the storage portion.

In the abovementioned embodiments, the verification ECU 20 is comparable to a permitter. The verification ECU 20, the interior LF antenna 22, and the RF receiver 24 to perform the process at S1 through S3 in FIG. 3 and S11 through S13 in FIG. 6 are comparable to a confirmer. The controller 30 to perform the process at S23 and S24 in FIGS. 4, S32 and S33 in FIG. 7, and S41 through S43 in FIG. 10 is comparable to an authenticator. The controller 30 and the RF transmitter 33 to perform the process at S25 and S26 in FIG. 4, S34 through S36 in FIG. 7, and S44 and S45 in FIG. 10 is comparable to a transmitter. The verification ECU 20 to perform the process at S4 through S6 in FIG. 3, S14 through S16 in FIG. 6, and S31 and S32 in FIG. 9 is comparable to an effectivity controller. The enablement request signal or the disablement request signal transmitted at S26 in FIGS. 4, S35 and S36 in FIG. 7, and S45 in FIG. 10 is comparable to an authentication result signal. The smartphone 4 is comparable to a portable apparatus. The LF signal transmitted at S2 in FIG. 3 and S12 in FIG. 6 is comparable to a confirmation signal.

Although the present disclosure is described based on the above embodiments, the present disclosure is not limited to the embodiments and the structures. Various changes and modification may be made in the present disclosure. Furthermore, various combination and formation, and other combination and formation including one, more than one or less than one element may be made in the present disclosure.

What is claimed is:

1. A vehicle control system comprising:
    a vehicle apparatus configured to be mounted to a vehicle; and
    a key configured to be carried by a user of the vehicle and to have wireless communication with the vehicle apparatus, wherein
    the vehicle apparatus includes a permitter configured to permit predetermined manipulation on the vehicle based on wireless communication with the key,
    the key includes:
    an authenticator configured to perform an authentication for authenticating that the user using the key is an authenticated user; and
    a transmitter configured to transmit an authentication result signal corresponding to a result of the authentication to the vehicle apparatus,
    the key includes a first key and a second key different from the first key,
    the vehicle apparatus further includes:
    a confirmer configured to confirm existence or non-existence of the second key in a vehicle interior by attempting wireless communication with the second key in the vehicle interior in response to locking of the vehicle by the first key; and
    an effectivity controller configured to:
        disable a function of the permitter concerning the second key when the confirmer confirms the existence of the second key in the vehicle interior and the authentication result signal concerning the second key indicates that the authentication is unsuccessful; and
        enable the function of the permitter concerning the second key when the confirmer confirms the existence of the second key in the vehicle interior and the authentication result signal concerning the second key indicates that the authentication is successful.

2. The vehicle control system according to claim 1, wherein
    the authenticator is configured to perform the authentication based on communication with a portable apparatus configured to be carried by the authenticated user and having a communication function.

3. The vehicle control system according to claim 2, wherein
    the confirmer is configured to transmit, toward the vehicle interior, a confirmation signal for confirming the existence or non-existence of the second key in response to the locking of the vehicle by the first key,
    the confirmer is further configured to determine the existence or non-existence of the second key in the vehicle interior based on existence or non-existence of a response signal transmitted from the second key in reply to the confirmation signal, and
    the authenticator is configured to start the authentication with the portable apparatus in response to receiving the confirmation signal.

* * * * *